United States Patent
Olofsson et al.

(10) Patent No.: US 11,683,308 B2
(45) Date of Patent: Jun. 20, 2023

(54) SYSTEMS AND METHODS FOR GENERATING CONTEXTUAL LABELS

(71) Applicant: Cisco Technology Inc., San Jose, CA (US)

(72) Inventors: Stefan Olofsson, Dubai (AE); Ijsbrand Wijnands, Leuven (BE); Hendrikus G. P. Bosch, Aalsmeer (NL)

(73) Assignee: CISCO TECHNOLOGY, INC., San Jose, CA (US)

( * ) Notice: Subject to any disclaimer, the term of this patent is extended or adjusted under 35 U.S.C. 154(b) by 457 days.

(21) Appl. No.: 16/562,867

(22) Filed: Sep. 6, 2019

(65) Prior Publication Data

US 2020/0389457 A1   Dec. 10, 2020

Related U.S. Application Data

(60) Provisional application No. 62/858,191, filed on Jun. 6, 2019.

(51) Int. Cl.
  *H04L 9/40*    (2022.01)
  *H04L 12/46*   (2006.01)
  *H04L 61/256*  (2022.01)

(52) U.S. Cl.
  CPC ...... *H04L 63/0892* (2013.01); *H04L 12/4641* (2013.01); *H04L 63/0272* (2013.01);
  (Continued)

(58) Field of Classification Search
  None
  See application file for complete search history.

(56) References Cited

U.S. PATENT DOCUMENTS

| | | | |
|---|---|---|---|
| 6,339,595 B1 * | 1/2002 | Rekhter | H04L 45/00 370/392 |
| 6,680,943 B1 * | 1/2004 | Gibson | H04L 9/40 370/395.21 |

(Continued)

FOREIGN PATENT DOCUMENTS

| | | |
|---|---|---|
| CN | 103580980 A | 2/2014 |
| CN | 108173981 A | 6/2018 |

(Continued)

OTHER PUBLICATIONS

Patent Cooperation Treaty, International Search Report and Written Opinion, International Application No. PCT/US2020/034610, dated Aug. 25, 2020, 9 pages.

(Continued)

*Primary Examiner* — Michael W Chao
(74) *Attorney, Agent, or Firm* — Baker Botts L.L.P.

(57) ABSTRACT

In one embodiment, an apparatus includes one or more processors and one or more computer-readable non-transitory storage media coupled to the one or more processors. The one or more computer-readable non-transitory storage media include instructions that, when executed by the one or more processors, cause the apparatus to perform operations including receiving a user credential from a remote access client within a network and communicating the user credential to an authentication, authorization and accounting (AAA) server within the network. The operations also include receiving a user attribute from the AAA server and generating a contextual label based on the user attribute. The contextual label includes routing instructions associated with traffic behavior within the network. The operations further include advertising a control message, which includes the contextual label, to the remote access client.

20 Claims, 5 Drawing Sheets

(52) U.S. Cl.
CPC ........ *H04L 63/083* (2013.01); *H04L 63/0823* (2013.01); *H04L 63/168* (2013.01); *H04L 61/2571* (2013.01)

(56) References Cited

U.S. PATENT DOCUMENTS

| | | | | |
|---|---|---|---|---|
| 7,319,699 | B1* | 1/2008 | Provine | H04L 45/505 370/428 |
| 8,095,786 | B1* | 1/2012 | Kshirsagar | H04L 63/0272 713/151 |
| 8,572,219 | B1* | 10/2013 | Shigapov | H04L 63/105 705/50 |
| 9,038,151 | B1* | 5/2015 | Chua | H04L 47/10 726/1 |
| 11,296,908 | B2* | 4/2022 | Lin | H04L 45/245 |
| 11,374,906 | B2* | 6/2022 | Martz | H04L 63/029 |
| 11,418,560 | B1* | 8/2022 | Hinds | H04L 67/02 |
| 11,444,872 | B2* | 9/2022 | Mayya | H04L 45/42 |
| 2004/0087304 | A1* | 5/2004 | Buddhikot | H04L 69/329 455/426.2 |
| 2004/0098622 | A1* | 5/2004 | O'Neill | H04L 69/167 713/151 |
| 2005/0063411 | A1* | 3/2005 | Wang | H04L 12/4608 370/437 |
| 2005/0091396 | A1* | 4/2005 | Nilakantan | H04L 45/04 709/232 |
| 2005/0102529 | A1* | 5/2005 | Buddhikot | H04L 67/306 726/26 |
| 2008/0225708 | A1* | 9/2008 | Lange | H04L 47/2408 370/252 |
| 2010/0063988 | A1* | 3/2010 | Khalid | H04L 69/22 709/202 |
| 2014/0032758 | A1* | 1/2014 | Barton | H04W 12/37 709/225 |
| 2014/0033271 | A1* | 1/2014 | Barton | H04W 12/64 726/1 |
| 2014/0040979 | A1* | 2/2014 | Barton | H04W 12/30 726/1 |
| 2015/0043590 | A1* | 2/2015 | Pan | H04L 45/304 370/392 |
| 2015/0049631 | A1* | 2/2015 | Heron | H04L 41/122 370/254 |
| 2015/0085664 | A1 | 3/2015 | Sachdev et al. | |
| 2015/0271102 | A1* | 9/2015 | Antich | H04L 47/781 370/230 |
| 2015/0319092 | A1* | 11/2015 | Ghai | H04L 47/12 370/230 |
| 2015/0350912 | A1* | 12/2015 | Head | H04L 61/2007 726/4 |
| 2016/0164728 | A1* | 6/2016 | Chakrabarti | H04L 41/0806 370/254 |
| 2017/0064749 | A1* | 3/2017 | Jain | H04L 67/1097 |
| 2017/0155724 | A1* | 6/2017 | Haddad | G06F 9/45541 |
| 2017/0245310 | A1* | 8/2017 | Chandramouli | H04W 76/10 |
| 2017/0310686 | A1* | 10/2017 | Ray | H04L 63/08 |
| 2019/0052558 | A1* | 2/2019 | Mehta | H04L 41/142 |
| 2019/0349268 | A1* | 11/2019 | Pai | H04L 63/0892 |
| 2021/0385736 | A1* | 12/2021 | Zaks | G06F 9/45558 |

FOREIGN PATENT DOCUMENTS

| | | |
|---|---|---|
| CN | 109495503 A | 3/2019 |
| EP | 2866389 A1 | 4/2015 |

OTHER PUBLICATIONS

Chinese Office Action corresponding to Chinese Patent Application No. CN202080048757.1, dated Nov. 14, 2022, 9 pages.

* cited by examiner

US 11,683,308 B2

SYSTEMS AND METHODS FOR GENERATING CONTEXTUAL LABELS

CROSS-REFERENCE TO RELATED APPLICATIONS

This application claims benefit of U.S. Provisional Patent Application No. 62/858,191 filed Jun. 6, 2019 by Stefan Olofsson et. al., and entitled "Dynamic Event Triggered Label Assignment and Distribution for Remote Access Clients," which is incorporated herein by reference as if reproduced in its entirety.

TECHNICAL FIELD

This disclosure generally relates to generating labels, and more specifically to systems and methods for generating contextual labels within a network.

BACKGROUND

In a mobile networking environment, remote access clients establish sessions with one or more routers. Existing virtual private network (VPN) segments can be extended to the remote access clients to provide connectivity. The router may maintain access lists to filter network traffic to the VPN segments. However, access lists may add to the forwarding process overhead.

DESCRIPTION OF EXAMPLE EMBODIMENTS

Overview

Figure 1:
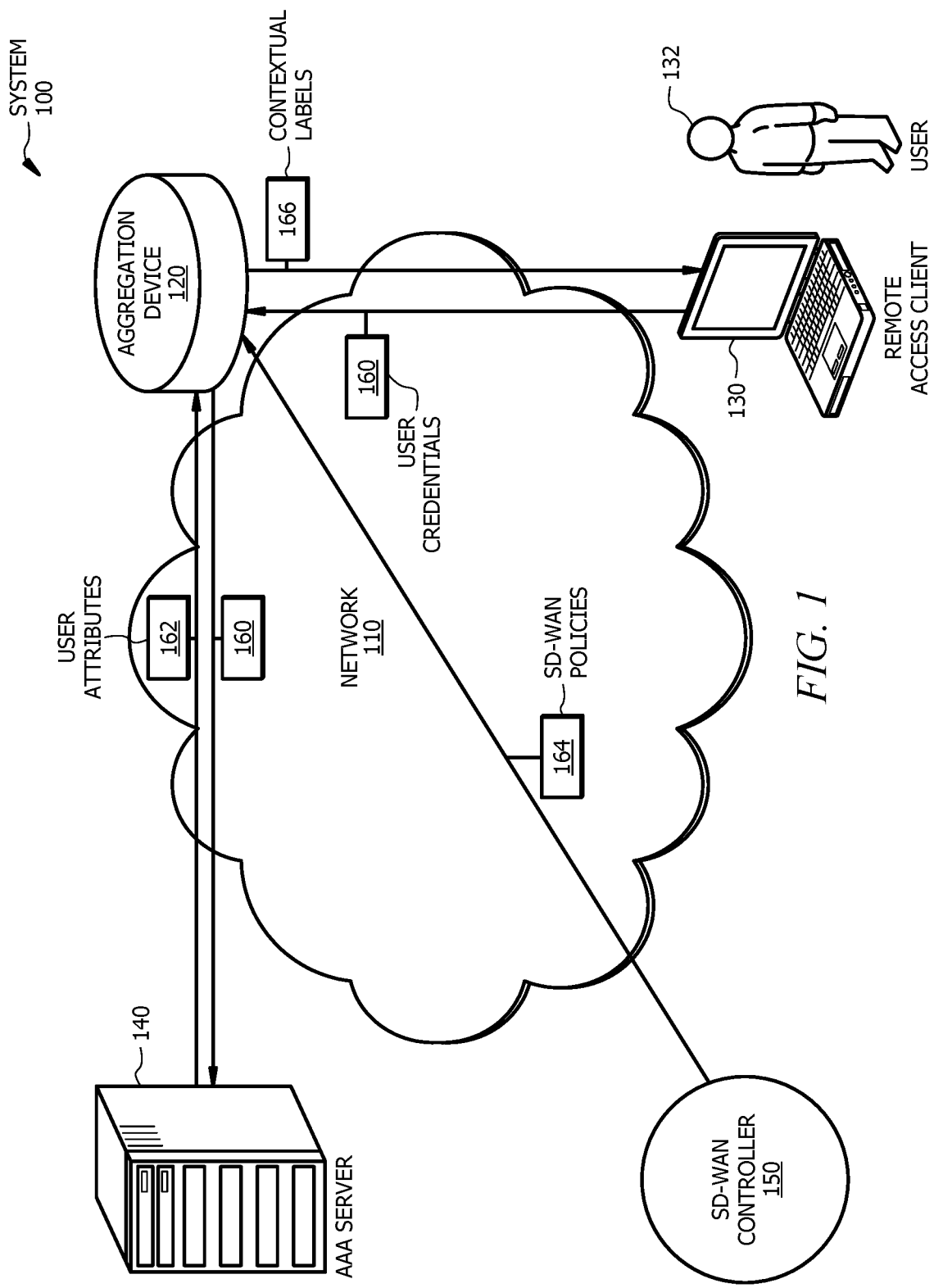
FIG. 1 illustrates a system for generating contextual labels in a networking environment, in accordance with certain embodiments.

According to an embodiment, an apparatus includes one or more processors and one or more computer-readable non-transitory storage media coupled to the one or more processors. The one or more computer-readable non-transitory storage media include instructions that, when executed by the one or more processors, cause the apparatus to perform operations including receiving a user credential from a remote access client within a network and communicating the user credential to an authentication, authorization and accounting (AAA) server within the network. The operations also include receiving a user attribute from the AAA server and generating a contextual label based on the user attribute. The contextual label includes routing instructions associated with traffic behavior within the network. The operations further include advertising a control message, which includes the contextual label, to the remote access client.

The operations may include receiving a policy from an SD-WAN controller. Generating the contextual label may be further based on the policy received from the SD-WAN controller. The user credential may be associated with one or more of the following: a username, a password, a cookie, or a certificate. The user attribute may be associated with one or more of the following: a security group, a quality of service (QoS) profile, and/or a Network Address Translation (NAT) profile. The routing instructions associated with the traffic behavior within the network may direct traffic to one or more VPN routing/forwarding (VRF) instances. The operations may include establishing an IP Security (IPsec) or Secure Socket Layer (SSL) session with the remote access client prior to generating the contextual label. The operations may include determining that the user attribute has changed and/or withdrawing the contextual label in response to determining that the user attribute has changed.

According to another embodiment, a method includes receiving, by an apparatus, a user credential from a remote access client within a network and communicating, by the apparatus, the user credential to an AAA server within the network. The method also includes receiving, by the apparatus, a user attribute from the AAA server and generating, by the apparatus, a contextual label based on the user attribute. The contextual label includes routing instructions associated with traffic behavior within the network. The operations further include advertising, by the apparatus, a control message that includes the contextual label to the remote access client.

According to another embodiment, one or more computer-readable non-transitory storage media include instructions that, when executed by a processor, cause the processor to perform operations including receiving a user credential from a remote access client within a network and communicating the user credential to an AAA server within the network. The operations also include receiving a user attribute from the AAA server and generating a contextual label based on the user attribute. The contextual label includes routing instructions associated with traffic behavior within the network. The operations further include advertising a control message, which includes the contextual label, to the remote access client.

According to yet another embodiment, a remote access client includes one or more processors and one or more computer-readable non-transitory storage media coupled to the one or more processors. The one or more computer-readable non-transitory storage media include instructions that, when executed by the one or more processors, cause the remote access client to perform operations including communicating a user credential to a router within a network and receiving a contextual label from the router in the network in response to communicating the user credential to the router within the network. The contextual label is generated based on the user credential and includes routing instructions associated with traffic behavior within the network. The operations further include applying the contextual label in accordance with the routing instructions.

Technical advantages of certain embodiments of this disclosure may include one or more of the following. A router may use systems and methods described herein to instruct a remote access client to forward information using contextual labels, which may provide a more scalable approach from an operational perspective and/or simplify the forwarding process overhead as compared to maintaining lists (e.g., access lists) of destination IP addresses. In certain embodiments, the contextual label may include instructions that associate incoming traffic with a specific set of attributes that impact the forwarding process and ultimately a target VRF instance. In some embodiments, one or more contextual labels are created and assigned by an aggregation device upon session establishment between the aggregation device and the remote access client and after completing AAA authorization, which may optimize the use of label space. Contextual labels may be used to extend software-defined networking in a wide area network (SD-WAN) services to remote access clients. This disclosure includes systems and methods for dynamically managing labels over the course of a remote access session such that SD-WAN capabilities may be efficiently extended to remote access clients in a scalable and manageable way.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

In a mobile SD-WAN network, a remote access client may establish a session (e.g., an IP Security (IPsec) or Secure Socket Layer (SSL) session) with an aggregation device. The aggregation device, which is also an SD-WAN edge, may include multiple configured VPN/VRF segment instances. The VPN/VRF segment instances may represent a complete suite of VPNs made available for use by the remote access clients attaching to the aggregation device. Depending on user credentials received by the aggregation device from an attached remote access client, the aggregation device may advertise a contextual label to the attached remote access client that provides the remote access client access to one or more of the configured VPN/VRF segments.

Figure 2:
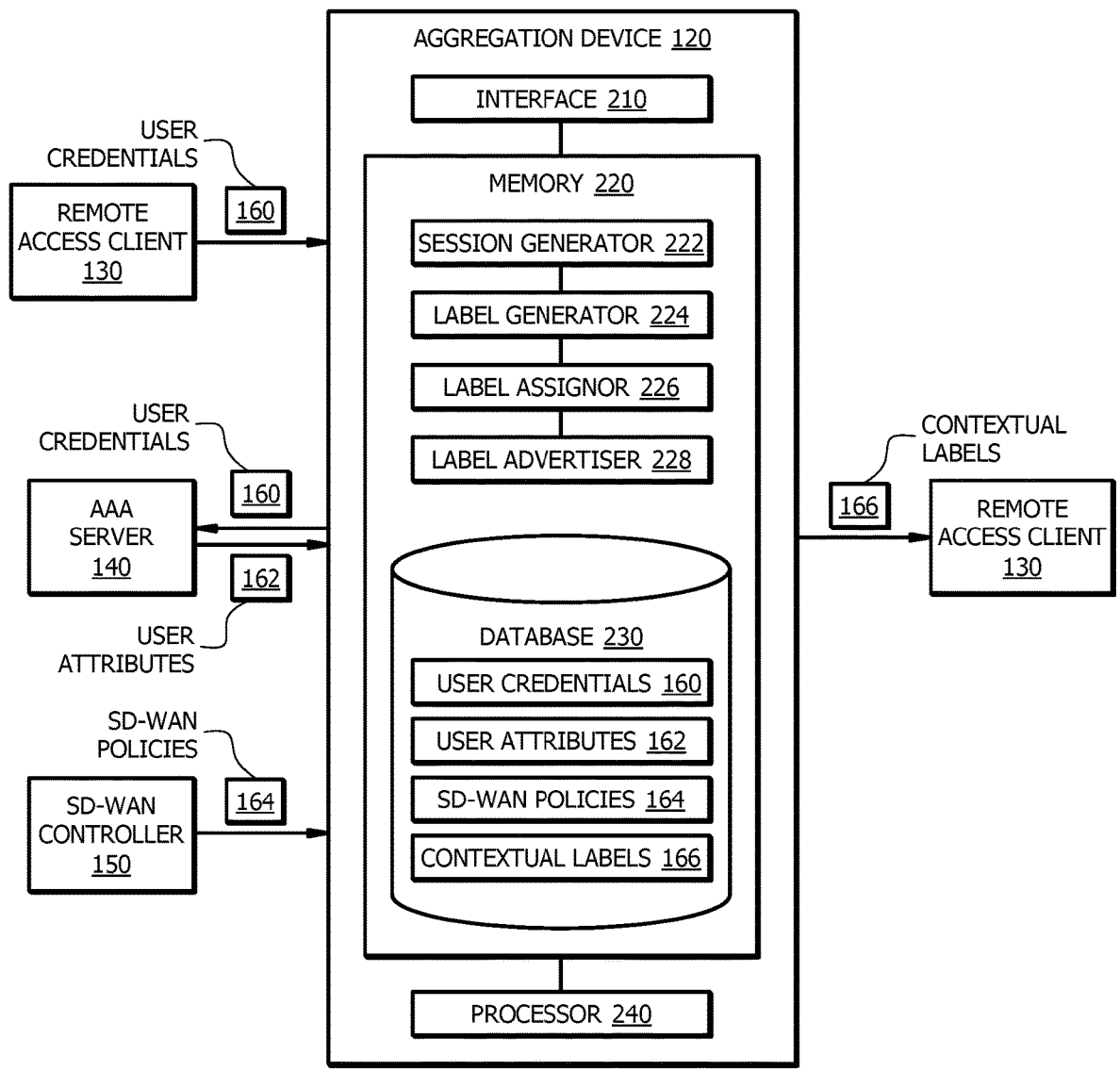
FIG. 2 illustrates a flow diagram for generating contextual labels within a networking environment that may be used by the system of FIG. 1, in accordance with certain embodiments.
Figure 3:
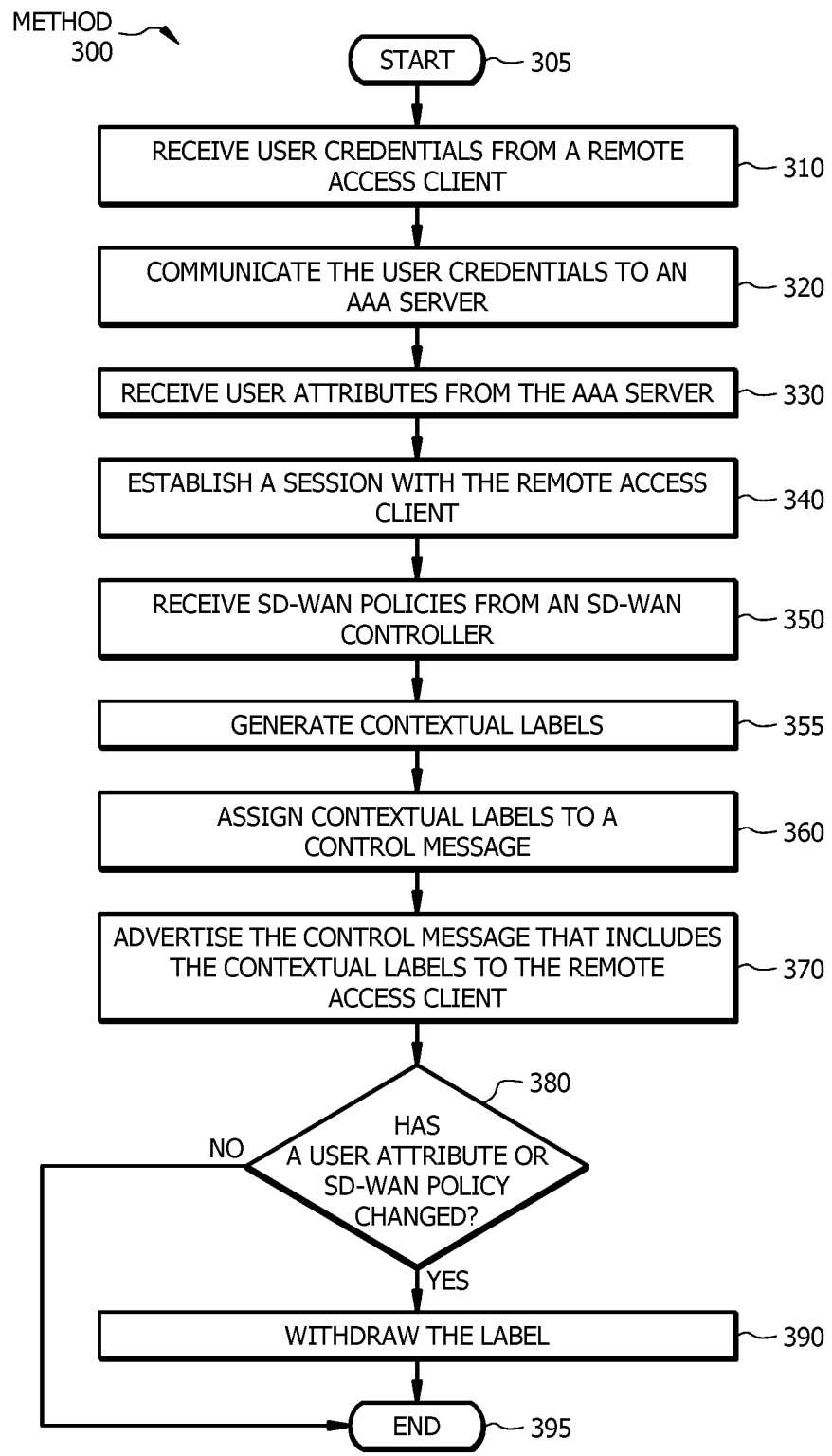
FIG. 3 illustrates a method for generating contextual labels, in accordance with certain embodiments.
Figure 4:
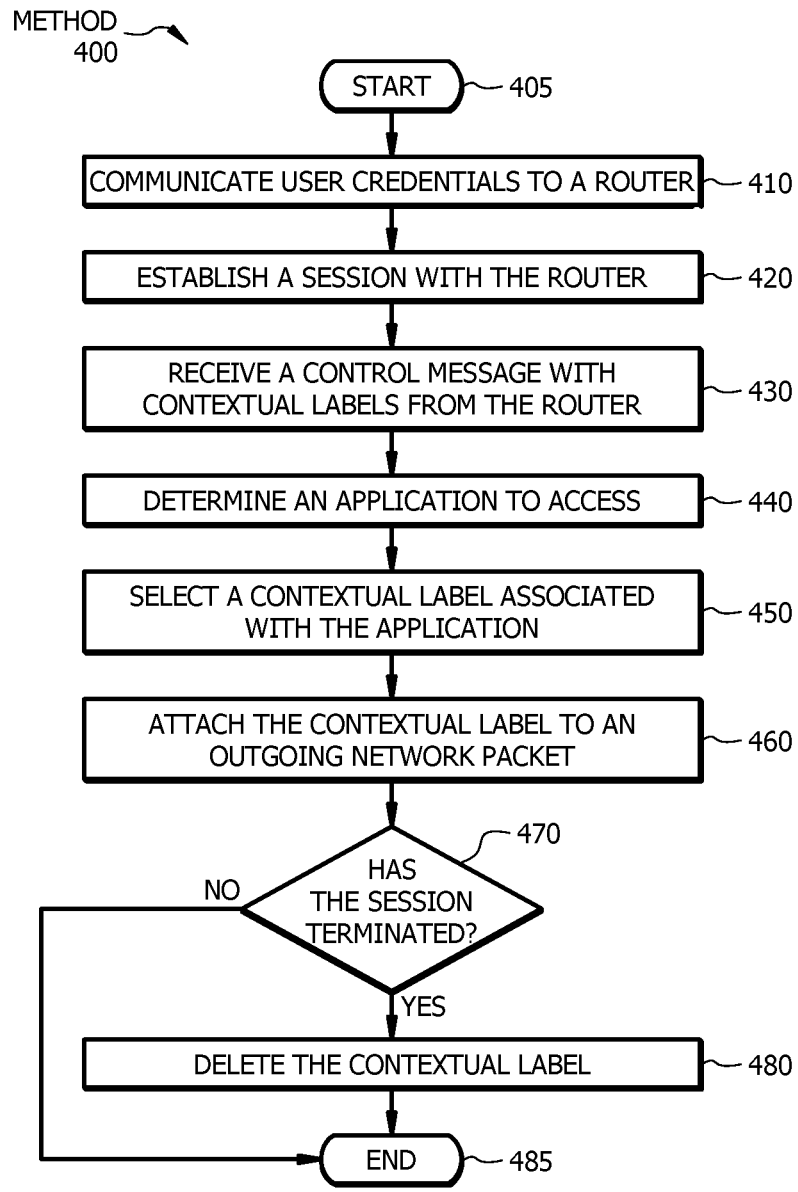
FIG. 4 illustrates a method for applying contextual labels, in accordance with certain embodiments.
Figure 5:
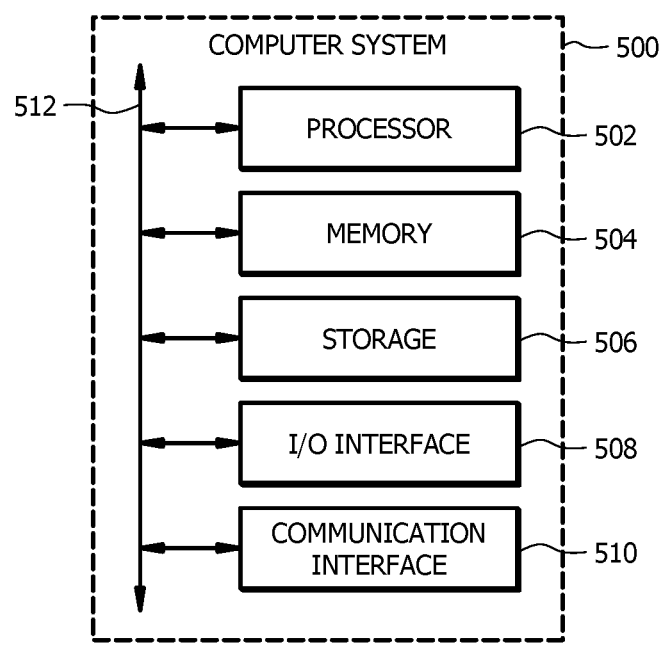
FIG. 5 illustrates a computer system, in accordance with certain embodiments.

FIG. 1 shows an example system for generating contextual labels in a networking environment, and FIG. 2 shows an example flow diagram for assigning contextual labels within a networking environment that may be used by the system of FIG. 1. FIG. 3 shows an example method for assigning contextual labels, and FIG. 4 shows an example method for applying contextual labels. FIG. 5 shows an example computer system that may be used by the systems and methods of FIGS. 1 through 4.

FIG. 1 shows an example system 100 for generating contextual labels 166 in a networking environment. System 100 or portions thereof may be associated with an entity, which may include any entity, such as a business or company (e.g., a service provider) that creates and/or assigns contextual labels 166. The components of system 100 may include any suitable combination of hardware, firmware, and software. For example, the components of system 100 may use one or more elements of the computer system of FIG. 5.

System 100 includes a network 110, an aggregation device 120, a remote access client 130, an AAA server, and an SD-WAN controller 150. Network 110 of system 100 is any type of network that facilitates communication between components of system 100. Network 110 may connect one or more components of system 100. This disclosure contemplates any suitable network 110. One or more portions of network 110 may include an ad-hoc network, an intranet, an extranet, a VPN, a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 may include one or more networks. Network 110 may be any communications network, such as a private network, a public network, a connection through Internet, a mobile network, a WI-FI network, etc. One or more components of system 100 may communicate over network 110. Network 110 may include a core network (e.g., the Internet), an access network of a service provider, an Internet service provider (ISP) network, and the like. One or more portions of network 110 may utilize SD-WAN technology. SD-WAN is a specific application of software defined networking (SDN) technology applied to WAN connections (e.g., broadband Internet, 4G, 5G, LTE, MPLS, etc.). SD-WAN connects enterprise networks (e.g., branch offices and data centers) over large geographic distances.

Aggregation device 120 of system 100 is a component (e.g., a router, a gateway, a combination thereof, etc.) that creates and/or assigns contextual labels 166. In networks 110 that utilize SD-WAN technology, aggregation device 120 may serve as an SD-WAN edge device. Aggregation device 120 stores multiple configured VPN/VRF segment instances. A VPN/VRF segment instance is a per-VPN routing information repository that defines the VPN membership of remote access client 130 attached to aggregation device 120. A VRF comprises an IP routing table, a forwarding table, a set of interfaces that use the forwarding table, and a set of rules and routing protocol parameters that control the information that is included in the routing table. A separate set of routing and forwarding tables is maintained for each VPN customer (e.g., user 132.)

Aggregation device 120 may create contextual labels 166 based on user attributes 162 received from AAA server 140 and/or SD-WAN policies 164 received from SD-WAN controller 150. Contextual labels 166 are used to classify IP packets within network 110. Each contextual label 166 includes instructions associated with traffic behavior within network 110. For example, contextual label 166 may include instructions for using a particular VPN/VRF segment instance to direct traffic. The instructions may be in the form of a value. For example, the instructions may be a value that represents the particular VPN/VRF segment instance. In certain embodiments, aggregation device 120 establishes a session with remote access client 130. For example, aggregation device 120 may establish an IPsec or SSL session with remote access client 130. Aggregation device 120 may communicate (e.g., advertise) one or more contextual labels 166 to remote access client 130.

Remote access client 130 of system 100 is any end device that receives information (e.g., contextual labels 166) from one or more components (e.g., aggregation device 120) of system 100. Remote access client 130 may be a mobile phone (e.g., a smart phone), a desktop computer, a laptop computer, a notebook computer, a tablet, a personal digital assistant, and the like. Remote access client 130 may include a liquid crystal display (LCD), an organic light-emitting diode (OLED) flat screen interface, digital buttons, a digital keyboard, physical buttons, a physical keyboard, one or more touch screen components, and the like. Remote access client 130 includes one or more applications, and one or more browsers, and the like. Remote access client 130 may be associated with an entity such as a service provider. Remote access client 130 may include one or more components of the computer system of FIG. 5.

Remote access client 130 of system 100 may be associated with a user 132. User 132 is any person, organization, or software program (e.g., an internet of things (IoT) device) that utilizes remote access client 130. Remote access client 130 may communicate one or more user credentials 160 to aggregation device 120. User credentials 160 are credentials that are used to identify user 132 of remote access client 130. User credentials 160 may include a user identification (e.g., a username), a password, a certificate (e.g., a Public Key Infrastructure (PKI) certificate), a single-sign-on cookie, and the like. User 132 may input one or more user credentials 160 into remote access client 130 to log into remote access client 130, to access one or more applications of remote access client 130, etc.

In certain embodiments, remote access client 130 establishes a session with aggregation device 120. For example, remote access client 130 may establish an IPsec or SSL session with aggregation device 120. After establishing a session with aggregation device 120, remote access client 130 of system 100 may receive one or more contextual labels 166 from aggregation device 120. For example, remote access client 130 may receive a control message from aggregation device 120 that includes one or more contextual labels 166. Contextual label 166 may include contextual information that instructs remote access client 130 how to apply contextual label 166. For example, contextual label 166 may include instructions for directing traffic within network 110 using multiple VPN/VRF segment instances.

AAA server 140 of system 100 is a component that provides authentication, authorization, and accounting services to one or more components of system 100. AAA server 140 may allow one or more other components of system 100 (e.g., aggregation device 120) to verify the identity of, grant access to, and/or track the actions of one or more components of system 100. AAA server 140 is associated with an enterprise. AAA server 140 may be hosted and/or proxied by an entity such as a service provider. In certain embodiments, AAA server 140 is a Remote Authentication Dial-In User Service (RADIUS) server. AAA server 140 may include one or more components of the computer system of FIG. 5.

In the illustrated embodiment of FIG. 1, AAA server 140 receives user credentials 160 from aggregation device 120. In response to receiving user credentials 160 from aggregation device 120, AAA server 140 may communicate user attributes 162 to aggregation device 120. User attributes 162 are attributes that may be customized to a particular user 132 and/or remote access client 130. User attributes 162 may include RADIUS attributes, RADIUS Internet Engineering Task Force (IETF) attributes, Diameter attributes as described in RFC4006, Terminal Access Controller Access Control System Plus (TACACS+) attributes, or any other suitable attributes. User attributes 162 may include authorization attributes such as a specific IP address to be assigned to user 132, an address pool from which the IP of user 132 should be chosen, a maximum length of time that user 162 may remain connected, restrictions on access for user 132, Layer Two Tunneling Protocol (L2TP) parameters, virtual LAN (VLAN) parameters, QoS parameters, etc.

In certain embodiments, user attributes 162 carry attribute-value pairs (AVPs). The AVPs may be specific to one or more policies for remote access client 130. Aggregation device 120 may use the AVPs to select policies (e.g., SD-WAN policies 164) received from SD-WAN controller 150. User attributes 162 may be associated with a security group, a QoS profile, a NAT profile, and the like. User attributes 162 communicated to aggregation device 120 by AAA server 140 may be used by aggregation device 120 to generate contextual labels 166.

SD-WAN controller 150 of system 100 is a component that manages and/or distributes SD-WAN policies 164 within network 110. SD-WAN controller 150 may include a management controller that creates and/or maintains SD-WAN policies 164. SD-WAN controller 150 may include a route reflector (e.g., a smart controller) that receives SD-WAN policies 164 from the management controller and/or pushes (e.g., advertises) SD-WAN policies 164 to aggregation device 120. SD-WAN controller 150 may be deployed by an enterprise. SD-WAN controller 150 may be associated with an entity such as a service provider. SD-WAN controller 150 may include one or more components of the computer system of FIG. 5. While SD-WAN controller 150 of system 100 communicates SD-WAN policies 164 to aggregation device 120 in the illustrated embodiment of FIG. 1, any suitable method may be used to communicate SD-WAN policies 164 to aggregation device 120. For example, a web-based database such as a key-value database may be used to communicate SD-WAN policies 164 to aggregation device 120.

In the illustrated embodiment of FIG. 1, SD-WAN controller 150 communicates SD-WAN policies 164 to aggregation device 120. SD-WAN policies 164 regulate aspects of control and forwarding within network 110. SD-WAN policies 164 may include access policies, segmentation-based policies, flow classification policies, path selection policies, and the like. SD-WAN policies may include application routing policies for application-aware routing, control policies for routing and control plane information, data policies for data traffic, VPN membership policies for limiting the scope of traffic to specific VPNs, and the like. In certain embodiments, SD-WAN policies 164 may map particular applications (e.g., an Internet browser, a media streaming application, a word processing application, etc.) to particular network paths (e.g., a first VPN/VRF segment instance or a second VPN/VRF segment instance). SD-WAN policies 164 communicated to aggregation device 120 by SD-WAN controller 150 may be used by aggregation device 120 to generate contextual labels 166.

In operation, remote access client 130 of system 100 communicates one or more user credentials 160 to aggregation device 120. In response to receiving user credentials 160 from remote access client 130, aggregation device 120 communicates user credentials 160 to AAA server 140. AAA server 140 associates user credentials 160 with one or more user attributes 162 and communicates user attributes 162 to aggregation device 120. SD-WAN controller 150 communicates one or more SD-WAN policies 164 to aggregation device 120. Aggregation device 120 creates one or more contextual labels 166 based on user attributes 162 and/or SD-WAN policies 164. Contextual labels 166 include instructions for forwarding traffic within network 110. Aggregation device 120 assigns contextual labels 166 to a control message and advertises the control message to remote access client 130. Remote access client 130 applies contextual labels 166 to direct incoming traffic throughout network 110. As such, system 100 of FIG. 1 uses contextual labels 166 to efficiently direct traffic within network 110.

Although FIG. 1 illustrates a particular arrangement of network 110, aggregation device 120, remote access client 130, AAA server 140, and SD-WAN controller 150, this disclosure contemplates any suitable arrangement of network 110, aggregation device 120, remote access client 130, AAA server 140, and SD-WAN controller 150. For example, AAA may be configured on aggregation device 120 in addition to or in lieu of AAA server 140. As another example, aggregation device 120 may be two or more physically separate devices (e.g., a router, a gateway, and a server).

Although FIG. 1 illustrates a particular number of networks 110, aggregation devices 120, remote access clients 130, AAA servers 140, and SD-WAN controllers 150, this disclosure contemplates any suitable number of networks 110, aggregation devices 120, remote access clients 130, AAA servers 140, and SD-WAN controllers 150. For example, system 100 may include multiple SD-WAN controllers 150 (e.g., a management controller and a smart controller) and multiple remote access clients 130.

FIG. 2 illustrates an example flow diagram 200 for assigning contextual labels 166 within a networking environment that may be used by system 100 of FIG. 1. Flow diagram 200 includes aggregation device 120, remote access client 130, AAA server 140, and SD-WAN controller 150. Aggregation device 120 includes an interface 210, a memory 220, and a processor 240. Interface 210 of aggregation device 120 represents any suitable computer element that can receive information from a network 110 of FIG. 1, transmit information through network 110, perform suitable processing of the information, communicate to other components (e.g., remote access client 130, AAA server 140, and SD-WAN controller 150) of flow diagram 200, or any combination of the preceding. Interface 210 represents any port or connection, real or virtual, including any suitable combination of hardware, firmware, and software, including protocol conversion and data processing capabilities, to communicate through a LAN, a WAN, or other communication system that allows aggregation device 120 to exchange information between components of flow diagram 200. In flow diagram 200, interface 210 of aggregation device 120 receives user credentials 160 from remote access client 130, user attributes 160 from AAA server 140, and SD-WAN policies 164 from SD-WAN controller 150 and transmits contextual labels 166 to remote access client 130.

Memory 220 of aggregation device 120 stores, permanently and/or temporarily, received and transmitted information, as well as system software, control software, other software for aggregation device 120, and a variety of other information. Memory 220 may store information for execution by processor 240. Memory 220 includes any one or a combination of volatile or non-volatile local or remote devices suitable for storing information. Memory 220 may include Random Access Memory (RAM), Read-only Memory (ROM), magnetic storage devices, optical storage devices, or any other suitable information storage device or a combination of these devices. Memory 220 may include any suitable information for use in the operation of aggregation device 120. Additionally, memory 220 may be a component external to (or may be partially external to) aggregation device 120. Memory 220 may be located at any location suitable for memory 220 to communicate with aggregation device 120. Memory 220 of aggregation device 120 stores multiple configured VPN/VRF segment instances. Memory 220 may store session generator 222, label generator 224, label assignor 226, and label advertiser 228.

Session generator 222 of aggregation device 120 establishes sessions with one or more remote access clients 130. The session is a temporary and interactive information interchange between aggregation device 120 and remote access client 130. Session generator 222 may establish a session with remote access client 130 after completing AAA authorization. The session is established at a certain point in time and is terminated at a certain point in time. Session generator 222 may establish one or more sessions with remote access client 130 using IPsec and/or SSL. In IPsec tunnel mode, an entire IP packet is protected by IPsec. IPsec wraps the IP packet, encrypts the IP packet, and sends the IP packet through the IPsec tunnel. The IPsec tunnel may be used to encrypt traffic between two secure IPsec gateways. SSL allows remote users (e.g., user 132 of FIG. 1) to establish a secure VPN tunnel using a web browser. SSL VPN technology uses SSL protocol and Transport Layer Security (TLS) (or Datagram TLS (DTLS)) to provide a secure connection between aggregation device 120 and remote access client 130.

The establishment of the session between aggregation device 120 and remote access client 130 may trigger the assignment of contextual label 166 by label assignor 226 and/or the advertisement of contextual label 166 by label advertiser 228. Upon termination of the session between aggregation device 120 and remote access client 130, session generator 222 may place the session in a default VPN/VRF segment instance unless provided with other instructions.

Label generator 224 of aggregation device 120 generates contextual labels 166. Label generator 224 may generate contextual labels 166 using user attributes 162 received from AAA server 140. For example, user attribute 162 may include a security group, and label generator 224 may create contextual label 166 with instructions for forwarding network traffic based on the security group. The instructions may direct traffic through a particular configured VPN/VRF segment instance. In certain embodiments, label generator 224 may generate contextual labels 166 using SD-WAN policies 164 received from SD-WAN controller 150. For example, SD-WAN policy 164 may map a particular application (e.g., an internet browser) to a particular network path (e.g., a first VPN/VRF segment instance), and label generator 224 may create contextual label 166 with instructions for mapping the particular application to the particular network path.

Label generator 224 may determine that one or more user attributes 162 and/or SD-WAN policies 164 have changed. For example, label generator 224 may determine that user attribute 162, which was associated with a first security group at the time label generator 224 created contextual label 166, is now associated with a second security group and not the first security group. In response to determining that one or more user attributes 162 and/or SD-WAN policies 164 have changed, label generator 224 may create one or more new contextual labels 166, withdraw one or more contextual labels 166 from remote access client 130, and/or delete one or more contextual labels 166.

Label assignor 226 of aggregation device 120 assigns contextual labels 166 to control messages. Control messages are messages that include information on how to route traffic through a network (e.g., an SD-WAN network). Control messages may include one or more communication parameters. Control messages communicate contextual labels 166 to remote access client 130. In certain embodiments, label assignor 226 may assign one or more contextual labels 166 within a policy. In some embodiments, label assignor 226 may not assign one or more contextual labels 166 within a policy to avoid collisions and/or to ensure that the distributed policy does not become specific to remote access client 130. Label assignor 226 may assign contextual labels 166 after session generator 222 establishes a session with remote access client 130 and after aggregation device 120 completes AAA authorization.

Label advertiser 228 communicates (e.g., advertises) one or more contextual labels 166 to one or more remote access clients 130. In certain embodiments, label advertiser 228 may advertise contextual label 166 to remote access client 130 in response to session generator 222 establishing a session with remote access client 130 and/or label assignor 226 assigning contextual label 166 to a control message and/or policy. Label advertiser 228 may withdraw one or more contextual labels 166 in response to one or more conditions. The conditions may include VRF connectivity issues, a determination that contextual labels 166 are out of sync, a change in one or more user attributes 162 and/or SD-WAN policies 164, and the like. Label advertiser 228 may advertise one or more contextual labels 166 to remote access client 130 using IPsec and/or SSL.

Memory 220 may store database 230. Database 230 may store certain types of information for aggregation device 120. For example, database 230 may store user credentials 160, user attributes 162, SD-WAN policies 164, and contextual labels 166. Database 230 may be any one or a combination of volatile or non-volatile local or remote devices suitable for storing information. Database 230 may include RAM, ROM, magnetic storage devices, optical storage devices, or any other suitable information storage device or a combination of these devices. Database 230 may be a component external to aggregation device 120. Database 230 may be located in any location suitable to store information associated with aggregation device 120.

Processor 240 of aggregation device 120 controls certain operations of aggregation device 120 by processing information received from interface 210 and memory 220 or otherwise accessed by processor 240. Processor 240 communicatively couples to interface 210 and memory 220. Processor 240 may include any hardware and/or software that operates to control and process information. Processor 240 may be a programmable logic device, a microcontroller, a microprocessor, any suitable processing device, or any suitable combination of the preceding. Additionally, processor 240 may be a component external to aggregation device 120. Processor 240 may be located in any location suitable for processor 240 to communicate with aggregation device 120. Processor 240 of aggregation device 120 controls the operations of session generator 222, label generator 224, label assignor 226, and label advertiser 228.

In operation, remote access client 130 of flow diagram 200 communicates one or more user credentials 160 to interface 210 of aggregation device 120. Interface 210 of aggregation device 120 communicates user credentials 160 to AAA server 140. AAA server 140 associates user credentials 160 with one or more user attributes 162 and communicates user attributes 162 to interface 210 of aggregation device 120. SD-WAN controller 150 communicates one or more SD-WAN policies 164 to interface 210 of aggregation device 120. Session generator 222 of aggregation device 120 establishes a session with remote access client 130 using IPsec or SSL after completing AAA authorization. In response to session generator 222 establishing the session with remote access client 130, label generator 224 of aggregation device 120 creates one or more contextual labels 166 using user attributes 162 received from AAA server 140 and/or SD-WAN policies 164 received from SD-WAN controller 150. Label assignor 226 assigns one or more contextual labels 166 to a control message. Label advertiser 228 advertises the control message to remote access client 130. As such, remote access client 130 may use contextual labels 166 to forward traffic within the network and potentially target particular VPN/VRF segment instances.

Although FIG. 2 illustrates a particular arrangement of aggregation device 120, remote access client 130, AAA server 140, SD-WAN controller 150, interface 210, memory 220, session generator 222, label generator 224, label assignor 226, label advertiser 228, database 230, and processor 240, this disclosure contemplates any suitable arrangement of aggregation device 120, remote access client 130, AAA server 140, SD-WAN controller 150 interface 210, memory 220, session generator 222, label generator 224, label assignor 226, label advertiser 228, database 230, and processor 240. Although FIG. 2 illustrates a particular number of aggregation devices 120, remote access clients 130, AAA servers 140, SD-WAN controllers 150 interfaces 210, memories 220, session generators 222, label generators 224, label assignors 226, label advertisers 228, databases 230, and processors 240, this disclosure contemplates any suitable number of aggregation devices 120, remote access clients 130, AAA servers 140, SD-WAN controllers 150 interfaces 210, memories, session generators 222, label generators 224, label assignors 226, label advertisers 228, databases 230, and processors 240.

FIG. 3 illustrates an example method 300 for assigning contextual labels. Method 300 begins at step 305. At step 310, a network component (e.g., aggregation device 120 of FIG. 1) receives user credentials (e.g., user credentials 160 of FIG. 1) from a remote access client (e.g., remote access client 130 of FIG. 1.) In certain embodiments, the network component is a router. The user credentials identify a user (e.g., user 132 of FIG. 1) of the remote access client. The user credentials may include a username, a password, a certificate, a cookie, and the like. Method 300 then moves from step 310 to step 320, where the network component communicates the user credentials to an AAA server (e.g., AAA server 140 of FIG. 1). The AAA server uses the user credentials to generate user attributes associated with the user of the remote access client. Method 300 then moves from step 320 to step 330, where the network component receives the user attributes from the AAA server. The network component may complete AAA authorization for remote access client 130 based on the user attributes received from the AAA server. Method 300 then moves from step 330 to step 340.

At step 340, the network component (e.g., session generator 222 of aggregation device 120 of FIG. 2) establishes a session with the remote access client. The network component may establish the session with the remote access client using IPsec or SSL. Method 300 then moves from step 340 to step 350, where the network component receives SD-WAN policies (e.g., SD-WAN policies 164 of FIG. 1) from an SD-WAN controller (e.g., SD-WAN controller 150 of FIG. 1). The SD-WAN policies may map applications to specific network paths. Method 300 then moves from step 350 to step 355, where the network component (e.g., label generator 224 of aggregation device 120 of FIG. 2) uses the user attributes received from the AAA server and/or the SD-WAN policies received from the SD-WAN controller to generate one or more contextual labels (e.g., contextual labels 166 of FIG. 1). The contextual labels instruct remote access client 130 how to forward traffic through the network. Method 300 then moves from step 355 to step 360.

At step 360, the network component (e.g., label assignor 226 of aggregation device 120 of FIG. 2) assigns the one or more contextual labels to a control message. In certain embodiments, the network component may assign the contextual labels to a policy that is included within the control message. Method 300 then moves from step 360 to step 370, where the network component (e.g., label advertiser 228 of aggregation device 120 of FIG. 2) advertises the control message with the contextual labels to the remote access client. Method 300 then moves from step 370 to step 380, where the network component determines whether a user attribute and/or an SD-WAN policy has changed. In certain embodiments, the network component repetitively (e.g., in real-time, continuously, or in accordance with a predetermined schedule) determines whether the user attribute and/or SD-WAN policy has changed. If the network component determines that the user attributes and/or SD-WAN policies have not changed, method 300 advances from step 380 to step 395, where method 300 ends. If the network component determines that the user attributes and/or SD-WAN policies have changed, method 300 moves from step 380 to step 390, where the network component withdraws the one or more contextual labels from the remote access client. Method 300 then moves from step 390 to step 395, where method 300 ends.

Although this disclosure describes and illustrates particular steps of method 300 of FIG. 3 as occurring in a particular order, this disclosure contemplates any suitable steps of method 300 of FIG. 3 occurring in any suitable order. For example, the network component may receive the SD-WAN policies from the SD-WAN controller (step 350) and cache the SD-WAN policies prior to the network component establishing the session with the remote access client (step 340). Moreover, although this disclosure describes and illustrates an example method 300 for assigning contextual labels within a network including the particular steps of the method of FIG. 3, this disclosure contemplates any suitable method 300 for assigning contextual labels within a network, including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

FIG. 4 illustrates an example method 400 for applying contextual labels. Method 400 begins at step 405. At step 410, a remote access client (e.g., remote access client 130 of FIG. 1) communicates user credentials (e.g., user credentials 160 of FIG. 1) to a network component (e.g., aggregation device 120 of FIG. 1.) The user credentials may include a username, a password, a certificate, a cookie, and the like. Method 400 then moves from step 410 to step 420, where the remote access client establishes a session with the network component. The remote access client may establish the session with the router using IPsec or SSL. Method 400 then moves from step 420 to step 430, where the remote access client receives a control message with contextual labels (e.g., contextual labels 166 of FIG. 1) from the router. The contextual labels may be generated by the network device using user attributes (e.g., user attributes 162 of FIG. 1) received from an AAA server (e.g., AAA server 140 of FIG. 1) and/or SD-WAN policies (e.g., SD-WAN policies 164 of FIG. 1) received from an SD-WAN controller (e.g., SD-WAN controller 150 of FIG. 1.) Method 400 then moves from step 430 to step 440.

At step 440, the remote access client determines an application to access. For example, the remote access client may determine to access an Internet browser or an application downloaded from an application store. Method 400 then moves from step 440 to step 450, where the remote access client selects a contextual label associated with the application. For example, remote access client may select a contextual label that was generated by the network component using an SD-WAN policy that mapped Internet browser to a particular VPN/VRF segment instance. Method 400 then moves from step 450 to step 460, where the remote access client attaches the selected contextual label to an outgoing network packet. The contextual label includes instructions for forwarding traffic within the network. Method 400 then moves from step 460 to step 470, where the remote access client determines whether the session with the router has terminated. If the remote access client determines that the session with the router has not terminated, method 400 advances from step 470 to step 485, where method 400 ends. If the remote access client determines that the session with the router has terminated, the remote access client deletes the contextual label. Method 400 then moves from step 480 to step 485, where method 400 ends.

Although this disclosure describes and illustrates particular steps of method 400 of FIG. 4 as occurring in a particular order, this disclosure contemplates any suitable steps of method 400 of FIG. 4 occurring in any suitable order. Moreover, although this disclosure describes and illustrates an example method 400 for applying contextual labels within a network including the particular steps of the method of FIG. 4, this disclosure contemplates any suitable method 400 for applying contextual labels within a network, including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes RAM. This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 604, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes ROM. Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a LAN, a WAN, a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 610, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. An apparatus, comprising:
   one or more processors; and
   one or more computer-readable non-transitory storage media coupled to the one or more processors and comprising instructions that, when executed by the one or more processors, cause the apparatus to perform operations comprising:
     receiving a user credential from a remote access client within a network;

communicating the user credential to an authentication, authorization and accounting (AAA) server within the network;
receiving a user attribute from the AAA server;
generating a contextual label based on the user attribute, wherein:
the contextual label comprises routing instructions associated with traffic behavior within the network; and
the routing instructions map an application to a Virtual Private Network (VPN) routing/forwarding (VRF) instance; and
advertising a control message to the remote access client, wherein:
the control message comprises the contextual label; and
the remote access client selects the contextual label associated with the application.

2. The apparatus of claim 1, the operations further comprising receiving a policy from software-defined wide area network (SD-WAN) controller, wherein generating the contextual label is further based on the policy received from the SD-WAN controller.

3. The apparatus of claim 1, wherein the user credential is associated with one or more of the following:
a username;
a password;
a cookie; or
a certificate.

4. The apparatus of claim 1, wherein the user attribute is associated with one or more of the following:
a security group;
a quality of service (QoS) profile; or
a Network Address Translation (NAT) profile.

5. The apparatus of claim 1, wherein the routing instructions associated with the traffic behavior within the network direct traffic to one or more VRF instances.

6. The apparatus of claim 1, the operations further comprising establishing an IP Security (IPsec) or Secure Socket Layer (SSL) session with the remote access client prior to generating the contextual label.

7. The apparatus of claim 1, the operations further comprising:
determining that the user attribute has changed; and
withdrawing the contextual label in response to determining that the user attribute has changed.

8. A method, comprising:
receiving, by an apparatus, a user credential from a remote access client within a network;
communicating, by the apparatus, the user credential to an authentication, authorization and accounting (AAA) server within the network;
receiving, by the apparatus, a user attribute from the AAA server;
generating, by the apparatus, a contextual label based on the user attribute, wherein:
the contextual label comprises routing instructions associated with traffic behavior within the network; and
the routing instructions map an application to a Virtual Private Network (VPN) routing/forwarding (VRF) instance; and
advertising a control message to the remote access client, wherein:
the control message comprises the contextual label; and
the remote access client selects the contextual label associated with the application.

9. The method of claim 8, further comprising receiving a policy from software-defined wide area network (SD-WAN) controller, wherein generating the contextual label is further based on the policy received from the SD-WAN controller.

10. The method of claim 8, wherein the user credential is associated with one or more of the following:
a username;
a password;
a cookie; or
a certificate.

11. The method of claim 8, wherein the user attribute is associated with one or more of the following:
a security group;
a quality of service (QoS) profile; or
a Network Address Translation (NAT) profile.

12. The method of claim 8, wherein the routing instructions associated with the traffic behavior direct traffic to one or more VRF instances.

13. The method of claim 8, further comprising establishing, by the apparatus, an IP Security (IPsec) or Secure Socket Layer (SSL) session with the remote access client prior to generating the contextual label.

14. The method of claim 8, further comprising:
determining, by the apparatus, that the user attribute has changed; and
withdrawing, by the apparatus, the contextual label in response to determining that the user attribute has changed.

15. One or more computer-readable non-transitory storage media embodying instructions that, when executed by a processor, cause the processor to perform operations comprising:
receiving a user credential from a remote access client within a network;
communicating the user credential to an authentication, authorization and accounting (AAA) server within the network;
receiving a user attribute from the AAA server;
generating a contextual label based on the user attribute, wherein:
the contextual label comprises routing instructions associated with traffic behavior within the network; and
the routing instructions map an application to a Virtual Private Network (VPN) routing/forwarding (VRF) instance; and
advertising a control message to the remote access client, wherein:
the control message comprises the contextual label; and
the remote access client selects the contextual label associated with the application.

16. The one or more computer-readable storage media of claim 15, the operations further comprising receiving a policy from software-defined wide area network (SD-WAN) controller, wherein generating the contextual label is further based on the policy received from the SD-WAN controller.

17. The one or more computer-readable storage media of claim 15, wherein the user credential is associated with one or more of the following:
a username;
a password;
a cookie; or
a certificate.

18. The one or more computer-readable storage media of claim 15, wherein the user attribute is associated with one or more of the following:
a security group;

a quality of service (QoS) profile; or a Network Address Translation (NAT) profile.

19. The one or more computer-readable storage media of claim 15, wherein the routing instructions associated with the traffic behavior within the network direct traffic to one or more VRF instances.

20. The one or more computer-readable storage media of claim 15, the operations further comprising establishing an IP Security (IPsec) or Secure Socket Layer (SSL) session with the remote access client prior to generating the contextual label.

* * * * *